United States Patent
Mohtadi et al.

(10) Patent No.: US 9,640,836 B1
(45) Date of Patent: *May 2, 2017

(54) CLASS OF SOLID STATE ELECTROLYTES FOR MAGNESIUM BATTERIES

(71) Applicant: Toyota Motor Engineering & Manufacturing North America, Inc., Erlanger, KY (US)

(72) Inventors: Rana Mohtadi, Northville, MI (US); Oscar Tutusaus, Ann Arbor, MI (US); Emily Nelson, Grand Rapids, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,359

(22) Filed: Feb. 12, 2016

(51) Int. Cl.
| | |
|---|---|
| *H01M 6/18* | (2006.01) |
| *H01M 10/0562* | (2010.01) |
| *H01M 10/0569* | (2010.01) |
| *H01M 10/054* | (2010.01) |

(52) U.S. Cl.
CPC ..... *H01M 10/0562* (2013.01); *H01M 10/054* (2013.01); *H01M 10/0569* (2013.01)

(58) Field of Classification Search
CPC ......... H01M 10/0562; H01M 10/0569; H01M 10/054
See application file for complete search history.

(56) References Cited

U.S. PATENT DOCUMENTS

| | | | |
|---|---|---|---|
| 6,316,141 B1 | 11/2001 | Aurbach et al. | |
| 2014/0302400 A1* | 10/2014 | Shao | H01M 10/0569 429/326 |
| 2015/0072250 A1* | 3/2015 | Mohtadi | H01M 10/054 429/341 |
| 2015/0229000 A1 | 8/2015 | Shao et al. | |
| 2015/0325881 A1 | 11/2015 | Mohtadi et al. | |

OTHER PUBLICATIONS

Mohtadi et al, "Magnesium Borohydride: From Hydrogen Storage to Magnesium Battery", Angew. Chem. Int., (2012), vol. 51, pp. 9780-9783.
Shao et al., "Coordination Chemistry in magnesium battery electrolytes: how ligands affect their performance", Sci Rep.; 3:3130, Nov. 4, 2013; 7 pgs.

* cited by examiner

*Primary Examiner* — Jane Rhee
(74) *Attorney, Agent, or Firm* — Christopher G. Darrow; Darrow Mustafa PC

(57) ABSTRACT

A solid-state electrolyte suitable for use in an electrochemical cell includes a first borohydride salt, a second borohydride salt, and an ether solvent. The first borohydride salt can be magnesium borohydride, or a variate thereof, and the second borohydride salt can include lithium and/or sodium borohydride. The ether solvent is present at low concentration, insufficient to form a liquid electrolyte. The solid-state electrolyte is a homogeneous solid at room temperature, and possesses appreciable ionic conductivity. Methods for forming the solid-state electrolyte include combining the aforementioned components at specified molar ratios, and may include additional mixing. Electrochemical cells having the solid-state electrolyte support appreciable current density, and magnesium electrochemical cells in particular support magnesium deposition and stripping.

14 Claims, 1 Drawing Sheet

CLASS OF SOLID STATE ELECTROLYTES FOR MAGNESIUM BATTERIES

TECHNICAL FIELD

The present disclosure relates to solid-state electrolytes and methods for making the same.

BACKGROUND

Magnesium batteries have received significant attention as potential replacements for lithium batteries due to their high volumetric capacity, lack of dendrite formation, and the relative inexpensiveness of magnesium. Discovery and development of suitable electrolytes for magnesium batteries has proven challenging. For instance, conventional inorganic magnesium salts have typically been found incompatible with reversible magnesium deposition as they tend to form an ion-blocking layer at the magnesium electrode during their electrochemical reduction. On the other hand, organic magnesium salts such as those derived from Grignard reagents have been found to be highly corrosive, particularly toward non-noble cathodes, possibly due to the presence of chloride co-anions.

Previous studies have shown that magnesium borohydride and related magnesium boron cluster salts are effective as liquid electrolytes in magnesium batteries, possessing high compatibility with metal and the versatility to function with a variety of magnesium-compatible cathodes. In virtually all such systems studied to date, the liquid-state electrolyte has been present as an ethereal solution, as ethers are the only solvents known to be compatible with magnesium metal.

The use of solid electrolytes generally has several advantages relative to comparable liquid electrolytes, including but not limited to a direct increase in energy density of the battery. A small number of solvent-free, or solid magnesium electrolytes have been reported. However, the known solid magnesium electrolytes generally have insufficient magnesium mobility to be practical in a magnesium battery at a desirable operating temperature.

SUMMARY

Solid-state electrolytes are provided. Methods for forming the solid-state electrolytes, as well as electrochemical cells utilizing the solid-state electrolytes are likewise provided.

In one aspect, the present technology discloses a method for forming a solid-state electrolyte. The method includes a step of combining a first borohydride salt and a second borohydride salt at a molar ratio relative to the first salt within a range of 0:1 to 10:1, inclusive, to produce a salt mixture. The first borohydride salt has a formula $Mg(BH_{4-n}X_n)_2$ or $Mg(BH_4)_z Y_{(2-z)}$, where n is an integer from zero to four and X is an alternate substituent such as halogen, alkyl, or aryl; and where Y is an anion such as $Cl^-$, $TFSI^-$, $CB_{11}H_{12}^-$, and z is a number between 0.1 and 2, inclusive. The second borohydride salt is at least one of $LiBH_4$, $NaBH_4$, and $(ER_1R_2R_3R_4)BH_4$ where E is nitrogen or phosphorus, and $R_1$, $R_2$, $R_3$, $R_4$ are each independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof. The method also includes a step of adding an ether solvent, having one or more ethereal oxygens, to the salt mixture, in an amount such that the ether solvent is present at a molar ratio relative to the first salt within a range of 0.1:1 to 10:1, inclusive.

In another aspect, the present technology discloses a solid-state electrolyte for use in an electrochemical cell. The solid-state electrolyte includes a first borohydride salt having a formula $Mg(BH_{4-n}X_n)_2$ or $Mg(BH_4)_z Y_{(2-z)}$ where n is an integer from zero to four, inclusive and X is an alternate substituent such as halogen, alkyl, or aryl; and where Y is an anion such as $Cl^-$, $TFSI^-$, $CB_{11}H_{12}^-$, and z is a number between 0.1 and 2, inclusive. The solid-state electrolyte may further include a second borohydride salt, present at a molar ratio relative to the first salt within a range of 0:1 to 10:1, the second salt comprising at least one of $LiBH_4$, $NaBH_4$, and $(ER_1R_2R_3R_4)BH_4$ where E is nitrogen or phosphorus and $R_1$, $R_2$, $R_3$, $R_4$ are each independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof. The solid-state electrolyte additionally includes an ether solvent present at a molar ratio relative to the first borohydride salt within a range of 0.1:1 to 10:1, inclusive.

In yet a further aspect, the present technology discloses an electrochemical cell. The electrochemical cell has an anode comprising elemental magnesium, a magnesium alloy, or a magnesium insertion compound, a cathode, and a solid-state electrolyte of the type described above.

These and other features of the method for forming a solid-state electrolyte and the electrochemical cell having the same will become apparent from the following detailed description when read in conjunction with the figures and examples, which are intended to be illustrative and not exclusive.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
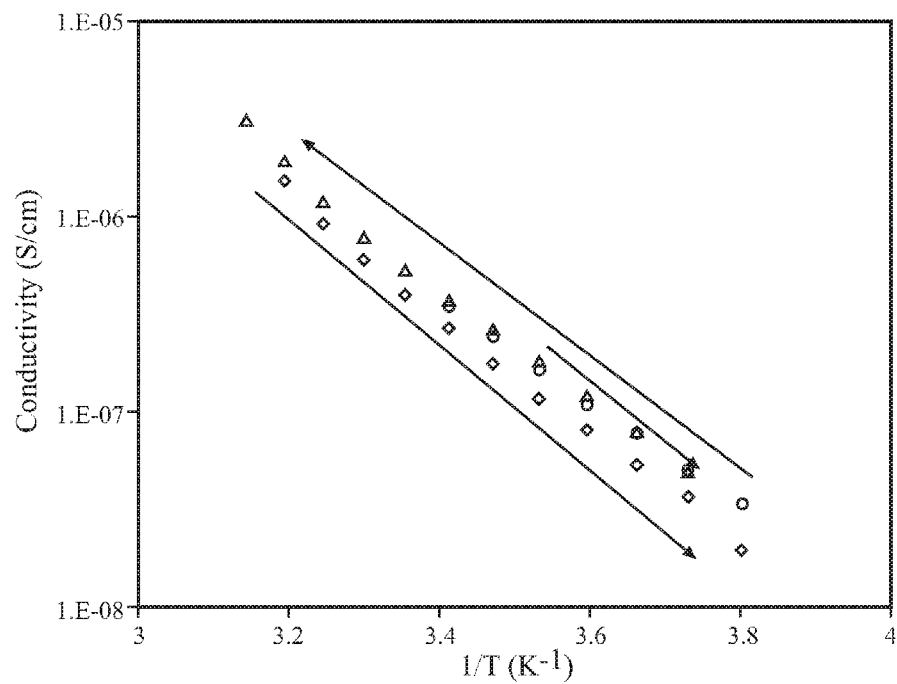
FIG. 1 is an Arrhenius plot showing the ionic ($Mg^{2+}$) conductivity of $Mg(BH_4)_2$:$LiBH_4$:triglyme solid state electrolyte.

The present disclosure provides a solid-state electrolyte, a method for making the solid-state electrolyte, and an electrochemical cell having the solid-state electrolyte. The solid-state electrolyte utilizes magnesium salts that have excellent anodic compatibility with magnesium metal, including high coulombic efficiency across a substantial electric potential window for many charge-discharge cycles. Due to the virtual exclusion of solvent, the solid-state electrolyte possesses appreciable energy density. Further, it has been discovered that the solid-state electrolyte made in accordance with the present teachings has the highest conductivity as compared to known solid magnesium electrolytes.

The solid-state electrolyte, as employed in the presently disclosed electrochemical cell and method for making the same, generally includes magnesium borohydride, or a variant thereof, and a second salt that can be lithium borohydride, sodium borohydride, or a salt having a formula $(ER_1R_2R_3R_4)BH_4$ where E is nitrogen or phosphorus, and $R_1$, $R_2$, $R_3$, $R_4$ are each independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof. The solid-state electrolyte also includes an ether solvent, having one or more ethereal oxygens. The ether solvent is present at a concentration insufficient to form a liquid electrolyte.

Accordingly, provided herein is a solid-state electrolyte suitable for use in an electrochemical cell. The solid-state electrolyte includes a first salt having a magnesium cation and a borohydride, or borohydride variant, anion, generally according to the formula $Mg(BH_{4-n}X_n)_2$ or $Mg(BH_4)_zY_{(2-z)}$, where n is an integer from zero to four, inclusive; X comprises one or more non-hydrogen groups such as halogen, alkyl, aryl, or a combination thereof; Y is an anion; and z is a number within a range of 0.1 to 2, inclusive. In some embodiments, n can be an integer from zero to three, inclusive. In some instances, the anion Y can be a monovalent anion, having charge −1. Suitable examples of such monovalent anions include, without limitation, $Cl^-$, $TFSI^-$, and $CB_{11}H_{12}^-$. Thus, while a typical example of a first salt is $Mg(BH_4)_2$, it will be appreciated that the first salt can include, for example, $Mg(BF_4)_2$, $Mg(BH_2F_2)_2$, $Mg(BF_4)(BH_2F_2)$, $Mg(BH_4)(TFSI)$, $Mg(BH_4)(CB_{11}H_{12})$, $Mg(B(CH_3)_2F_2)$, or any mixture thereof.

The solid-state electrolyte additionally may include a second salt, the second salt being at least one of $LiBH_4$, $NaBH_4$, and $(ER_1R_2R_3R_4)BH_4$ where E is nitrogen or phorphorous, and $R_1$, $R_2$, $R_3$, $R_4$ are each, independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof. In some variations, one or more hydrogens of the borohydride moiety of the second salt can be replaced with other groups, as described above with respect to the first salt. The second salt will generally be present at a molar ratio, relative to the first salt, within a range of 0:1 to 10:1, inclusive.

The solid-state electrolyte also includes an ether solvent, defined as a molecule having at least one ethereal oxygen characterized by the structure R—O—R'. In many implementations, the ether solvent will be a multidentate ether solvent, having at least two, or a plurality of, ethereal oxygens. The ether solvent will typically be a room temperature liquid or a solid that melts at a temperature below 100° C., capable of solvating the first and second salts. It will generally be present at a concentration insufficient to completely dissolve the first and/or second salts. In particular, the ether solvent can be present at a molar ratio, relative to the first salt, within a range of 0.1:1 to 10:1. Thus, it is anticipated that the ether solvent will be contained predominantly or entirely in the coordination sphere of the magnesium cation of the first salt.

Suitable examples of ether solvents include, without limitation, dimethoxyethane (glyme, having two ethereal oxygens), diethylene glycol dimethyl ether (diglyme, having three ethereal oxygens), triethylene glycol dimethyl ether (triglyme, having four ethereal oxygens), tetraethylene glycol dimethyl ether (tetraglyme, having five ethereal oxygens), another polyether such as a polyetheylene glycol (PEG), or solid, high-molar-mass polymers (for example, poly(ethylene oxide), PEO, the latter two having potentially much larger numbers of ethereal oxygens). In some instances, PEG dimethyl ether (PEGDME) having a number average molecular weight (Mn) of 500 is employed. The ether solvent can also include a combination of individual ether solvents.

A solid-state electrolyte of the present disclosure will generally form a homogeneous solid at room temperature and will have appreciable ionic conductivity, even at ambient or near-ambient temperature. For example, a solid-state electrolyte having a 1:2:2 molar ratio of $Mg(BH_4)_2$:$LiBH_4$:triglyme forms, after extended mixing, a glassy, homogeneous solid. Having been pressed into a flattened shape and assayed for ionic conductivity, the solid-state electrolyte demonstrates remarkably high conductivity, as shown in FIG. 1.

FIG. 1 shows an Arrhenius plot, having conductivity plotted logarithmically vs. inverse temperature, for a solid-state electrolyte $Mg(BH_4)_2$:$LiBH_4$:triglyme at molar ratios of 1:2:2. As shown in FIG. 1, the exemplary solid-state electrolyte has a conductivity of ~$10^{-4}$ mS/cm at 5° C. and ~$10^{-3}$ mS/cm at 40° C. As previous magnesium solid electrolytes require a temperature of 150° C. to achieve $10^{-3}$ mS/cm, this result represents a dramatic decrease in the required operating temperature to achieve a desirable conductivity. It should be noted that the data represented by circles in FIG. 1 shows conductivity measured during initial cooling from room temperature, triangles show conductivity during heating of the electrolyte, and diamonds show conductivity during recooling.

Also disclosed is a method for forming a solid-state electrolyte for use in an electrochemical cell. The method comprises a step of combining a first borohydride salt and a second borohydride salt at a molar ratio within a range of 0:1 to 10:1 inclusive, to produce a salt mixture. The first and second borohydride salts used in the method are as described above. The method also includes a step of adding an ether solvent to the salt mixture such that the ether solvent is present relative to the first borohydride salt at a molar ratio within a range of 0.1:1 to 10:1, inclusive. The ether solvent to be used in the method is as described above. The salt mixture can optionally be ball-milled prior to combining the ether solvent with the salt mixture.

As described above, the resulting product can form as a homogeneous solid at room temperature. The product also displays high conductivity at ambient or near-ambient temperature, as in the example of FIG. 1.

While formation of the solid-state electrolyte can be achieved in some instances directly after addition of the ether solvent, in some instances the product initially forms as a slurry. In some such instances, it can be desirable to include an additional mixing step in the method. In such instances, mixing can be achieved by stirring the slurry for a duration sufficient to result in solid-state electrolyte formation. In some implementations, such a duration will be from 1-50 hours. In some instances, such stirring can be performed at a temperature in the range of 25° C. to 150° C. In another implementation, mixing of the solvate can be achieved by ball-milling the solvate.

Additionally provided herein is an electrochemical cell comprising a solid-state electrolyte. In some implementations, the electrochemical cell can be a magnesium battery wherein a reduction/oxidation reaction according to Reaction I occurs:

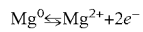

$$Mg^0 \leftrightharpoons Mg^{2+} + 2e^- \qquad \qquad \text{I.}$$

In many implementations, the electrochemical cell may be a secondary battery or a subunit of a secondary battery. In such implementations, it is to be understood that the term "anode" as used herein refers to an electrode at which magnesium oxidation occurs during cell discharge and at which magnesium reduction occurs during cell charging. Similarly, it is to be understood that the term "cathode"

refers in such implementations to an electrode at which a cathode material reduction occurs during cell discharge and at which a cathode material oxidation occurs during cell charging.

The electrochemical cell has an anode, a cathode, and at least one external conductor, the at least one external conductor being configured to enable electrical communication between the anode and the cathode. The electrochemical cell further includes a solid-state electrolyte, the solid-state electrolyte being in all particulars as described above. In some implementations, the electrochemical cell can employ the solid-state electrolyte as a conductive protective layer covering one or more surfaces of the anode, the cathode, or both.

The anode can comprise any material or combination of materials effective to participate in electrochemical oxidation of magnesium during a cell discharge. Similarly, the anode can comprise any material or combination of materials effective to participate in electrochemical reduction of magnesium cations and to incorporate reduced magnesium during a cell charging event. In some implementations, the anode can consist essentially of elemental magnesium (i.e. magnesium atoms having no formal charge) or comprise at least one surface layer of elemental magnesium. In other implementations, the anode can comprise an insertion-type magnesium electrode such as a tin electrode, containing magnesium in complex or alloy with other materials to the extent the cell is charged.

The cathode can comprise any material or combination of materials effective to participate in electrochemical insertion of magnesium cations during a cell discharge. Similarly, the cathode can comprise any material or combination of materials effective to participate in electrochemical extraction of magnesium during a cell charging event. Suitable non-limiting examples of such materials can include a Chevrel phase molybdenum composition, such as $Mo_6S_8$ (reversibly $MgMo_6S_8$), $FeSiO_4$ (reversibly $MgFeSiO_4$), $K-\alpha MnO_2$, $MgFePO_4$, sulfur, organosulfur compounds, air, redox active organic molecules, redox active organic polymers, metal organic frameworks or any other suitable materials.

In a simple implementation, the at least one external conductor can be a single conductor such as wire connected at one end to the anode and at an opposite end to the cathode. In other implementations, the at least one external conductor can include a plurality of conductors putting the anode and the cathode in electrical communication with a device configured to supply power to the electrochemical cell during a charging event, with other electrical devices situated to receive power from the electrochemical cell, or both.

Figure 2:
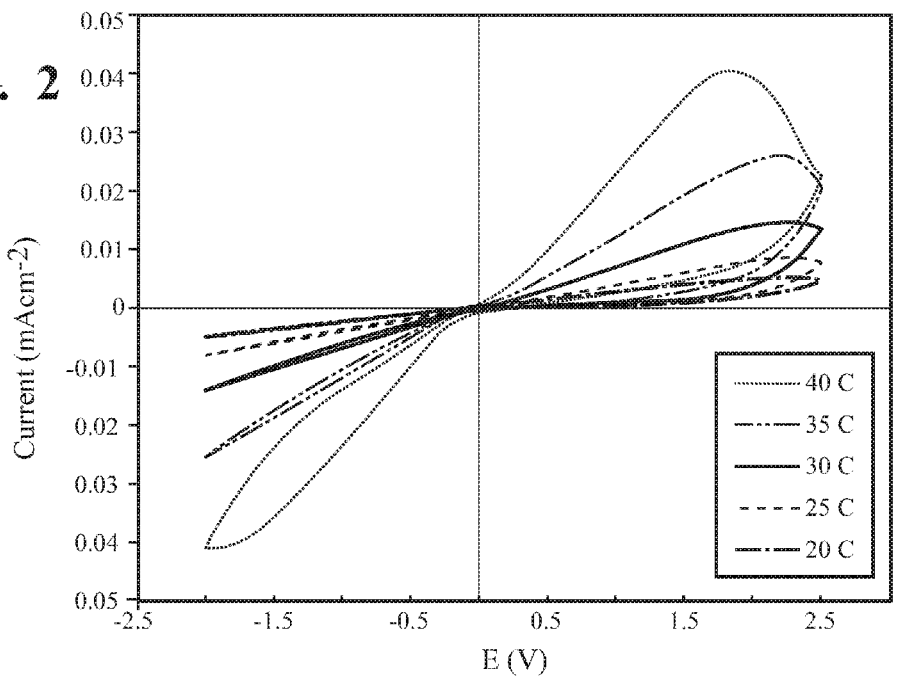
FIG. 2 is a cyclic voltammogram of a platinum (Pt) working electrode in a magnesium electrochemical cell employing the solid-state electrolyte of FIG. 1.

FIG. 2 shows cyclic voltammetry results at multiple temperatures for an electrochemical cell having a platinum cathode as working electrode. The cathode is in contact with the solid-state electrolyte of FIG. 1 (1:2:2 $Mg(BH_4)_2$:$LiBH_4$:triglyme) as the electrolyte. The counter and reference electrodes are both magnesium metal. The results show magnesium deposition and stripping, with appreciable current density even at temperatures as low as 20° C. At a still relatively low operating temperature of 40° C., the electrochemical cell achieves a current density of approximately 0.04 mA/cm² during discharge, at an electric potential less than 2 V.

The present invention is further illustrated with respect to the following examples. It needs to be understood that these examples are provided to illustrate specific embodiments of the present invention and should not be construed as limiting the scope of the present invention.

Example 1

Formation of Solid Electrolyte Having $Mg(BH_4)_2$:$LiBH_4$:Triglyme (1:2:2)

0.28 g $Mg(BH_4)_2$ is mixed with 0.12 g $LiBH_4$ (molar ratio of 1:2). 1.9 ml of triglyme (triethylene glycol dimethyl ether) is slowly added and the mixture vigorously stirred at room temperature for 48 hrs. A homogeneous solid forms, and pressing of the solid forms a glassy, transparent material. The material displays high ionic conductivity, as shown in FIG. 1.

Example 2

Ionic Conductivity Measurement

About 50 mg of the solid from Example 1 is pressed between two platinum electrodes. The temperature is slowly elevated then slowly decreased and the conductivity is recorded. The results, exemplified in FIG. 1, show the ionic conductivity of magnesium cations within the solid electrolyte as a function of temperature increase and reduction.

Example 3

Preparation of Electrochemical Cells and Testing Thereof

Electrochemical testing is conducted in a two-electrode MTI cell placed inside an MBraun glove box at 25° C. at less than 0.1 ppm $O_2$ and $H_2O$ content. The electrodes include: working electrode—platinum; counter and reference electrode—magnesium disk. The platinum electrode is polished, sonicated, and kept in a dry vacuum oven prior to each experiment. The surfaces of all magnesium electrodes are rubbed with a glass slide prior to use to remove any possible oxides.

Electrochemical testing is conducted using a BioLogic potentiostat run at a scan rate of 5 $mV \cdot s^{-1}$ and data is acquired and analyzed with EC-lab Software®. Since the reference electrode is a magnesium disk, the electrochemical testing is conducted in an electric potential range within −2.0 and 2.5 V to monitor the electrochemical activity due to magnesium deposition and stripping.

The foregoing description is merely illustrative in nature and is in no way intended to limit the disclosure, its application, or uses. As used herein, the phrase at least one of A, B, and C should be construed to mean a logical (A or B or C), using a non-exclusive logical "or". It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range. For example, a range of 1-5 can include any of 1-2, 1-3, 1-4, 2-3, 2-4, 2-5, 3-4, 3-5, and 4-5.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method for forming a solid-state electrolyte, the method comprising:
   combining:
   a first salt comprising a salt of at least one of the following formulae:

$Mg(BH_{4-n}X_n)_2$; and $Mg(BH_4)_zY_{(2-z)}$, where n is an integer between 0 and 4, inclusive; X is halogen, alkyl, aryl, or a combination thereof; Y is an anion; and z is a number within a range of 0.1 to 2, inclusive; and a second salt, present at a molar ratio relative to the first salt within a range of 0.1:1 to 10:1, inclusive, the second salt comprising at least one of the following:

$LiBH_4$;

$NaBH_4$;

$(ER_1R_2R_3R_4)BH_4$, where E is nitrogen or phosphorus; and $R_1$, $R_2$, $R_3$, and $R_4$ are each, independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof; and adding an ether solvent, having one or more ethereal oxygens, such that the ether solvent is present at a molar ratio within a range of 0.1:1 to 10:1, inclusive, relative to the first salt.

2. The method as recited in claim 1, wherein the first salt comprises $Mg(BH_4)_2$.

3. The method as recited in claim 1, further comprising a step of ball-milling the salt mixture prior to combining the ether solvent with the salt mixture.

4. The method as recited in claim 1, wherein addition of the ether solvent produces a slurry, and the method further comprises a step of mixing the slurry at temperature range between 20-150° C.

5. The method as recited in claim 4, wherein mixing the slurry comprises stirring the slurry for a duration of at least about 24 hours.

6. The method as recited in claim 1, wherein the ether solvent comprises at least one of a glyme, diglyme, triglyme, tetraglyme, polyethylene glycol, mono- or dialkylated polyethylene glycol, polyethylene oxide and mono- or dialkylated polyethylene oxide.

7. A solid-state electrolyte for an electrochemical cell, the solid-state electrolyte comprising:
   a first salt comprising a salt of at least one of the following formulae:

$Mg(BH_{4-n}X_n)_2$; and $Mg(BH_4)_zY_{(2-z)}$, where n is an integer between 0 and 4, inclusive; X is a halogen, alkyl, aryl, or a combination thereof; Y is an anion; and z is a number within a range of 0.1 to 2, inclusive; and a second salt, present at a molar ratio relative to the first salt within a range of 0.1:1 to 10:1, inclusive, the second salt comprising at least one of the following:

$LiBH_4$;

$NaBH_4$;

$(ER_1R_2R_3R_4)BH_4$, where E is nitrogen or phosphorus; and $R_1$, $R_2$, $R_3$, and $R_4$ are each, independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof; and an ether solvent present at a molar ratio relative to the first salt within a range of 0.1:1 to 10:1, inclusive, relative to the first salt.

8. The solid-state electrolyte as recited in claim 7, wherein the first salt comprises $Mg(BH_4)_2$.

9. The solid-state electrolyte as recited in claim 7, wherein the ether solvent comprises at least one of a glyme, diglyme, triglyme, tetraglyme, polyethylene glycol, mono- or dialkylated polyethylene glycol, polyethylene oxide and mono- or dialkylated polyethylene oxide.

10. The solid-state electrolyte as recited in claim 7, having an ionic conductivity of $10^{-3}$ mS/cm at 40° C.

11. An electrochemical cell having:
    an anode;
    a cathode; and
    a solid-state electrolyte comprising:
    a first salt comprising a salt of at least one of the following formulae:

$Mg(BH_{4-n}X_n)_2$; and $Mg(BH_4)_zY_{(2-z)}$, where n is an integer between 0 and 4, inclusive; X is a halogen, alkyl, aryl, or combination thereof; Y is an anion; and z is a number within a range of 0.1 to 2, inclusive; and a second salt, present at a molar ratio relative to the first salt within a range of 0.1:1 to 10:1, inclusive, the second salt comprising at least one of the following:

LiBH$_4$;

NaBH$_4$;

(ER$_1$R$_2$R$_3$R$_4$)BH$_4$, where E is nitrogen or phosphorus; and R$_1$, R$_2$, R$_3$, and R$_4$ are each, independently alkyl, aryl, partially or fully fluorinated alkyl, partially or fully fluorinated aryl, alkyl ether, aryl ether, partially or fully fluorinated alkyl ether, partially or fully fluorinated aryl ether, hydrogen, or a combination thereof; and an ether solvent present at a molar ratio relative to the first salt within a range of 0.1:1 to 10:1, inclusive.

12. The electrochemical cell as recited in claim 11, wherein the first salt comprises Mg(BH$_4$)$_2$.

13. The electrochemical cell as recited in claim 11, wherein the ether solvent comprises at least one of a glyme, diglyme, triglyme, tetraglyme, polyethylene glycol, mono- or dialkylated polyethylene glycol, polyethylene oxide and mono- or dialkylated polyethylene oxide.

14. The electrochemical cell as recited in claim 11, wherein the solid-state electrolyte has an ionic conductivity of 10$^{-3}$ mS/cm at 40° C.

\* \* \* \* \*